(12) United States Patent
Blake

(10) Patent No.: US 6,527,113 B2
(45) Date of Patent: Mar. 4, 2003

(54) WATERPROOF FLY FISHING FLY TACKLE BOX

(76) Inventor: Todd Blake, 1020 Francisco St., San Francisco, CA (US) 94109

( * ) Notice: Subject to any disclaimer, the term of this patent is extended or adjusted under 35 U.S.C. 154(b) by 0 days.

(21) Appl. No.: 09/848,851

(22) Filed: May 3, 2001

(65) Prior Publication Data

US 2002/0003096 A1 Jan. 10, 2002

Related U.S. Application Data

(60) Provisional application No. 60/201,600, filed on May 3, 2000, and provisional application No. 60/201,900, filed on May 4, 2000.

(51) Int. Cl.[7] ............................................... B65D 85/00
(52) U.S. Cl. .................................. 206/315.11; 206/523
(58) Field of Search ......................... 206/315.1, 315.11, 206/523; 43/42, 42.22, 54.1, 57.1; 220/4.22, 4.24, 4.21

(56) References Cited

U.S. PATENT DOCUMENTS

| 4,101,031 A | * | 7/1978 | Cromie | 206/523 |
| 4,240,222 A | * | 12/1980 | Covington | 206/315.11 |
| 4,653,220 A | * | 3/1987 | Olsen, Sr. | 43/57.1 |
| 5,526,927 A | * | 6/1996 | McLemore | 206/315.11 |
| 5,547,079 A | * | 8/1996 | Pino | 206/315.11 |
| 5,555,671 A | * | 9/1996 | Voight et al. | 206/315.11 |
| 6,241,090 B1 | * | 6/2001 | Kaplinsky | 206/315.11 |

* cited by examiner

Primary Examiner—Luan K. Bui
(74) Attorney, Agent, or Firm—Vierra Magen Marcus; Harmon & DeNiro LLP

(57) ABSTRACT

A waterproof fly fishing fly box is disclosed including a central base member, a top cover and a bottom cover. The top and bottom covers affix to the central base member so that, when closed, the top cover and central base member define a first internal environment therebetween. Similarly, when the bottom cover is closed, the bottom cover and central base member define a second internal environment. The fly fishing fly box further includes a first and second closed cell foam layers affixed to and covering substantially all of a top surface and bottom surface, respectively, of the central base member. The first and second foam layers serve to fix the flies within the first and second internal environments, and to ensure a tight seal of the first and second internal environments against water from the surrounding environment.

14 Claims, 2 Drawing Sheets

WATERPROOF FLY FISHING FLY TACKLE BOX

CROSS REFERENCE TO RELATED APPLICATION

The present application claims priority to U.S. Provisional Patent Application Ser. No. 60/201,600, entitled, "Waterproof Fly Fishing Fly Tackle Box", filed May 3, 2000, and the present application also claims priority to U.S. Provisional Patent Application Ser. No. 60/201,900, entitled "Waterproof Fly Fishing Fly Tackle Box", filed May 4, 2000.

BACKGROUND OF THE INVENTION

1. Field of the Invention

The present invention relates to the pastime of fly fishing, and in particular to a tackle box for use in fly fishing which may be easily opened and closed and which has a waterproof interior when closed.

2. Description of Related Art

As fresh water fish such as trout feed on flies and other insects that float on or have sunk below the water surface, fishermen have long used lures that are made to appear as flies either floating on or within the water. In wet fly fishing, the fly is designed to sink below the surface. Conversely, in dry fly fishing, the fly is designed to be extremely light so that it may float on the water as a consequence of surface tension. Floating is achieved through the use of a flotation coating on the fly, such as petroleum jelly or the like and particular constructional features which enhance the ability of the relatively light fly to rest on top of the water.

Even in dry fly fishing, the fly absorbs moisture which diminishes its surface tension. As such, the fly must be periodically dried and replaced. Moreover, flies may be lost from time to time and fishermen may desire a variety of flies so that, in the event one type of fly is not working, they can switch to another. Fly fishermen therefore carry one or more fly boxes in which a number of flies are stored. Fly boxes are typically small, flat, hinged boxes with a closure, and a foam insert piece, or compartments, into which the hooks can be placed.

In dry fly fishing, it is very important to keep the flies within the fly box dry because, as indicated above, when the flies absorb moisture, they will not float. Moreover, as each fly box can carry as much as $500 worth of flies, it is desirable that the fly box not sink if dropped into the water.

SUMMARY OF THE INVENTION

It is therefore an advantage of the present invention to provide a waterproof fly box which seals an interior of the box against moisture.

It is another advantage of the present invention to provide a waterproof fly box which will not sink if dropped into the water.

It is a further advantage of the present invention to provide a box which may be easily opened to allow access to the flies stored therein, and which maybe easily closed to seal the interior of the box against moisture.

These and other advantages are provided by the present invention which in preferred embodiments relates to a waterproof fly fishing fly box. The fly fishing fly box includes a central base member, a top cover and a bottom cover. The top and bottom covers affix to the central base member so that, when closed, the top cover and central base member define a first interior environment therebetween. Similarly, when the bottom cover is closed, the bottom cover and central base member define a second interior environment. The first and second interior environments are isolated from the surrounding environment and each other.

The fly fishing fly box further includes a first and second closed cell foam layers affixed to and covering substantially all of a top surface and bottom surface, respectively, of the central base member. The first and second foam layers serve at least two functions. First, the hooks to which the flies are attached may be buried in the layers to secure the flies within the box in fixed positions. Second, the foam layers ensure a tight seal of the first and second internal environments against water from the surrounding environment. Thus, in the event the fly box falls into the water, not only will it float, but the flies within stay dry.

BRIEF DESCRIPTION OF THE DRAWINGS

The present invention will now be described with reference to the drawings in which.

DETAILED DESCRIPTION

The present invention will now be described with reference to FIGS. 1–3, which in preferred embodiments relates to a fly fishing fly tackle box for keeping fly tackle dry. While preferred embodiments of the present invention relate to a tackle box for use in fly fishing, it is understood that the tackle box according to the present invention may be used in other types of fishing.

Figure 1:
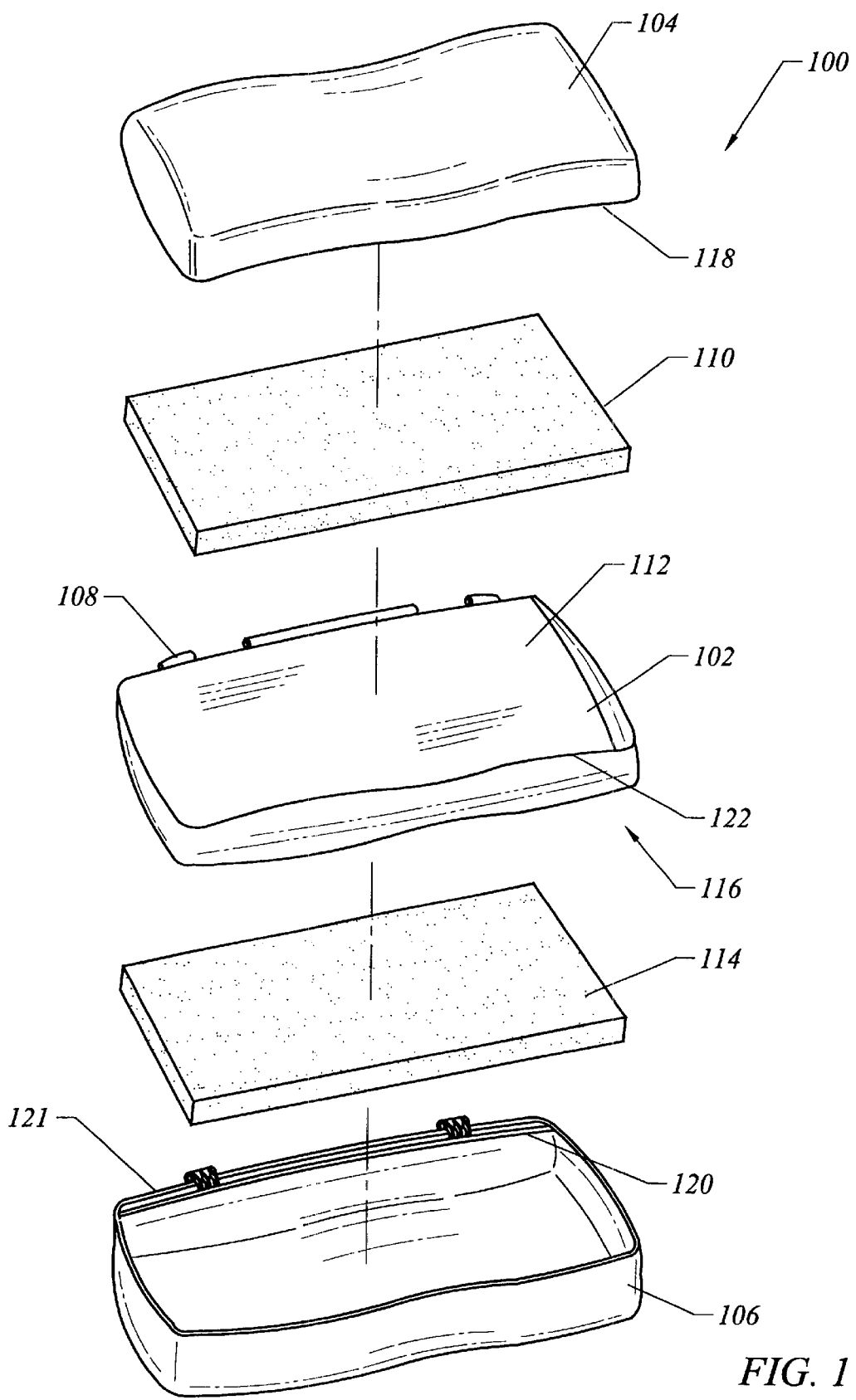
FIG. 1 is an exploded perspective view of the fly fishing fly tackle box according to the present invention.
Figure 2:
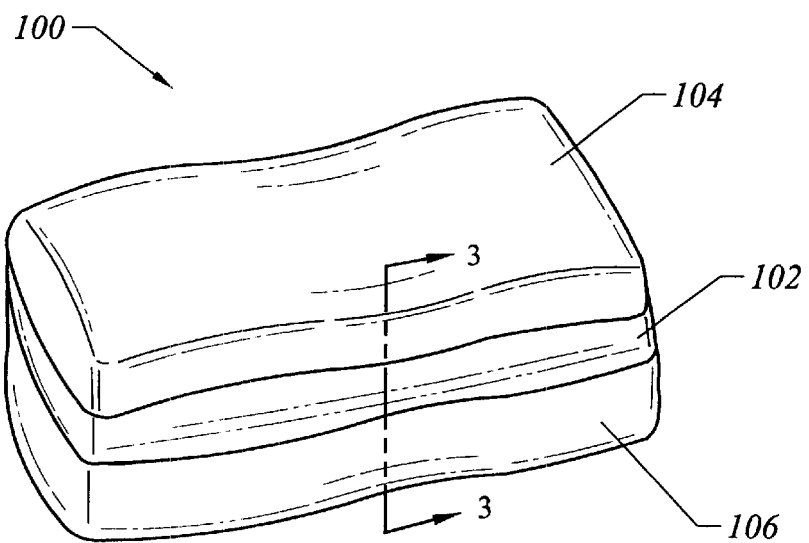
FIG. 2 is a perspective view of the fly fishing fly tackle box according to the present invention with the top and bottom covers sealed to the central base.
Figure 3:
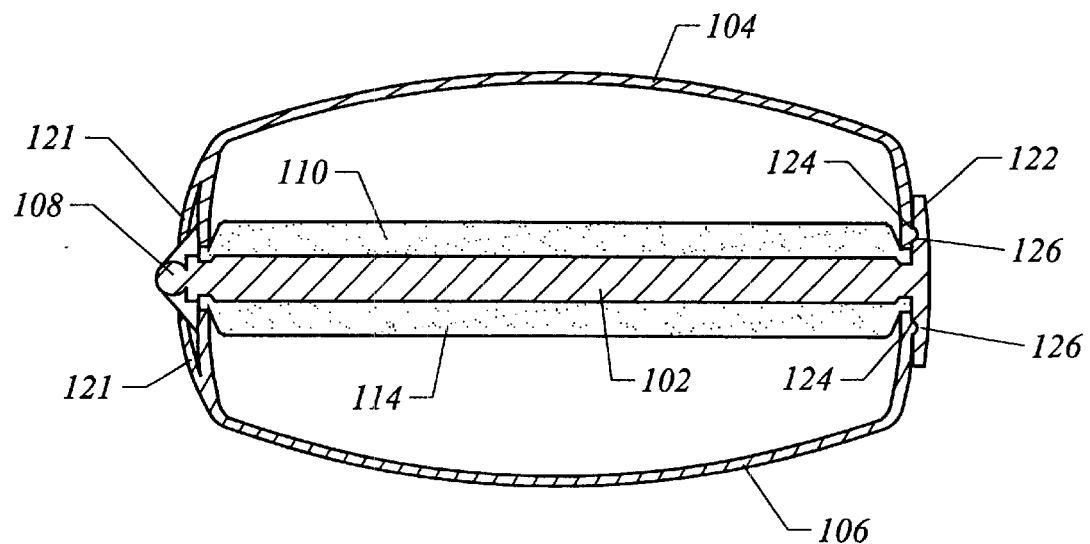
FIG. 3 is a cross-sectional view of the fly fishing fly tackle box according to the present invention through line 3—3 of FIG. 2.

Referring to FIGS. 1 and 2, there is shown a box 100 including a central base member 102, as well as a top cover 104 and a bottom cover 106 which both affix to the central base member 102 at a rear hinge 108 in a known manner. When closed, the top cover 104 lies inside a top portion of the central base member 102 to define a first interior environment between the member 102 and cover 104. Similarly, when the bottom cover 106 is closed, it lies inside a bottom portion of the central base member 102 to define a second interior environment between the member 102 and cover 104. The first and second interior environments are isolated from each other.

The central base member 102, and covers 104, 106 are preferably formed of any of various durable and lightweight polymers. The covers 104 and 106 are additionally translucent in a preferred embodiment to allow viewing of the flies stored within the respective interior environments. It is understood that the covers need not be translucent in alternative embodiments. Each of the base member and covers may be injection molded, and both covers may be identical, formed from a single mold, to reduce the overall cost of manufacture.

The box 100 further includes a first closed cell foam layer 110 affixed to and covering substantially all of a planar top surface 112 of the central base member 102, and a second closed cell foam layer 114 affixed to and covering all of a planar bottom surface 116 of the central base member 102. The layers 110 and 114 may be affixed to the respective surfaces 112, 116 of member 102 by various known adhesives. The first and second closed cell foam layers 110, 114 are of a custom designed shape to fit the contour of the top and bottom surfaces 112, 114. The foam is preferably a closed cell, cross-linked polyethylene foam, manufactured by a number of foam manufacturers such as Zote in Great Britain and Youngbo in Taiwan. Other known closed cell foams are contemplated.

The upper cover includes a lower edge 118 (i.e., adjacent to the central base member) lying in a single plane substantially parallel and in close proximity to the top surface 112 when the upper cover is closed. Similarly, the lower cover includes an upper edge 120 (also adjacent the central base member) lying in a single plane substantially parallel and in lose proximity to the bottom surface 116 when the lower cover is closed. At the rear edge (i.e., adjacent the hinge 108), the edge 118 and edge 120 lie inward of an outer wall section 121 on both the upper and lower covers.

The first and second foam layers 110 and 114 serve two functions. First, the hooks to which the flies are attached may be buried in the layers 110, 114 to secure the flies within the box 100 in fixed positions. Second, the layers 110, 114 ensure a tight seal of the first and second internal environments against water from the surrounding environment. In particular, as shown in the cross-sectional view of FIG. 3, when the upper cover 104 is closed, it pinches down on the first closed cell foam layer 110 around the entire lower edge 118 to thereby seal off the first interior environment against any moisture from the surrounding environment. When the lower cover 106 is closed, it pinches down on the second closed cell foam layer 114 around the entire upper edge 120 to thereby seal off the second interior environment against any moisture from the surrounding environment.

In a preferred embodiment, as indicated above, the lower edge 118 and top surface 112 lie in parallel planes when the upper cover is closed. However, in alternative embodiments, it is understood that the lower edge 118 need not lie in a single plane, provided that it conforms to the shape of the top surface 112 so that when the upper cover is closed, it pinches down on foam rubber layer 110 on surface 112 with a substantially equal pressure around the entire lower edge. The same is true for the upper edge 120 and bottom surface 116.

The central base member 102 may include an upwardly and downwardly extending lip 122 circumjacent about the edges 118 and 120 of upper and lower covers 104, 106. Lip 122 further enhances the seal formed by the upper and lower edges 118, 120 against the foam rubber layers 110, 114.

Any of various known mechanisms maybe used to maintain the covers 104 and 106 in a closed engagement against the central base member 102. For example, as shown in FIG. 3, the covers 104, 106 may include protrusions 124 which mate within detents 126 on the lip 122 when the covers are closed. The respective positions of the protrusions and detents may be reversed in alternative embodiments. The protrusions and detents together provide a system for easily opening and closing the covers 104, 106. It is understood that several other known closing systems may be used to keep the covers in a closed position when desired, but also allowing easy opening when desired. Such additional alternative systems include clasps on covers 104 and 106, a press fit of the covers 104, 106 against the base member 102, and magnets on the covers 104 and 106 and/or central base member 102.

Although the invention has been described in detail herein, it should be understood that the invention is not limited to the embodiments herein disclosed. Various changes, substitutions and modifications may be made thereto by those skilled in the art without departing from the spirit or scope of the invention.

I claim:

1. A fishing tackle box comprising:
    a central base having a first surface and a second side opposite said first surface;
    a cover pivotally affixed to said central base, said cover and said central base capable of defining an enclosed environment when said cover is closed against said central base;
    a closed cell foam layer, affixed to said first surface of said central base, for sealing said enclosed environment against an environment surrounding the fly fishing tackle box, and for securing a fishing tackle within the fly fishing tackle box;
    said cover comprising a first cover, said enclosed environment comprising a first enclosed environment and said closed cell foam layer comprising a first closed cell foam layer, the fishing tackle box further comprising:
    a second cover pivotally affixed to said central base, said second cover and said central base defining a second enclosed environment;
    a second closed cell foam layer, affixed to said second surface of said central base, for sealing said second enclosed environment against an environment surrounding the fly fishing tackle box, and for securing a fishing tackle within the fly fishing tackle box.

2. A fishing tackle box as recited in claim 1, at least one of said central base and said cover being formed of a polymer.

3. A fishing tackle box as recited in claim 1, said cover being formed of a translucent material.

4. A fishing tackle box as recited in claim 1, further comprising a closure mechanism for holding said cover and said central base closed together.

5. A fishing tackle box as recited in claim 4, said closure mechanism comprising a protrusion on one of said cover and central base and a detent on the other of said cover and central base.

6. A fishing tackle box as recited in claim 4, said closure mechanism comprising a press fit between said cover and said central base.

7. A fishing tackle box as recited in claim 4, said closure mechanism comprising a clasp affixed to one of said cover and said central base.

8. A fishing tackle box as recited in claim 4, said closure mechanism comprising a magnet on one of said cover and said central base.

9. A fly fishing tackle box comprising:
    a central base having a first surface and a second side opposite said first surface;
    a closed cell foam layer affixed to said first surface, said closed cell foam layer capable of securing a fishing tackle within the fly fishing tackle box; and
    a cover pivotally affixed to said central base, said cover having a circumferential edge capable of compressing said closed cell foam layer along a line of contact between said edge and said closed cell foam layer upon closure of said cover on said central base to form a seal between said cover and said central base, said seal substantially preventing water from entering into an interior of the fishing tackle box between said cover and said central base.

10. A fly fishing tackle box as recited in claim 9, said closed cell foam layer comprising a first cell foam layer, said cover comprising a first cover, said circumferential edge comprising a first circumferential edge, and said seal comprising a first seal, the fly fishing tackle box further comprising:

a second closed cell foam layer affixed to said second surface, said second closed cell foam layer capable of securing a fishing tackle within the fly fishing tackle box; and a second cover pivotally affixed to said central base, said second cover having a second circumferential edge capable of compressing said second closed cell foam layer along a second line of contact between said second edge and said second closed cell foam layer upon closure of said second cover on said central base to form a second seal between said second cover and said central base, said second seal substantially preventing water from entering into an interior of the fishing tackle box between said second cover and said central base.

11. A fly fishing tackle box as recited in claim 10, said first cover capable of closing on said central base independently of said second cover closing on said central base.

12. A fly fishing tackle box as recited in claim 9, at least one of said central base and said cover being formed of a polymer.

13. A fly fishing tackle box as recited in claim 9, said cover being formed of a translucent material.

14. A fly fishing tackle box as recited in claim 9, further comprising a closure mechanism for holding said cover and said central base closed together.

* * * * *